March 19, 1946.  A. G. S. SANDISON  2,397,049
BOAT CONSTRUCTION
Filed Aug. 23, 1944  6 Sheets-Sheet 1

Alexander G. S. Sandison. Inventor.

March 19, 1946.   A. G. S. SANDISON   2,397,049
BOAT CONSTRUCTION
Filed Aug. 23, 1944   6 Sheets-Sheet 2

Alexander G. S. Sandison
Inventor.

March 19, 1946.   A. G. S. SANDISON   2,397,049
BOAT CONSTRUCTION
Filed Aug. 23, 1944   6 Sheets-Sheet 4
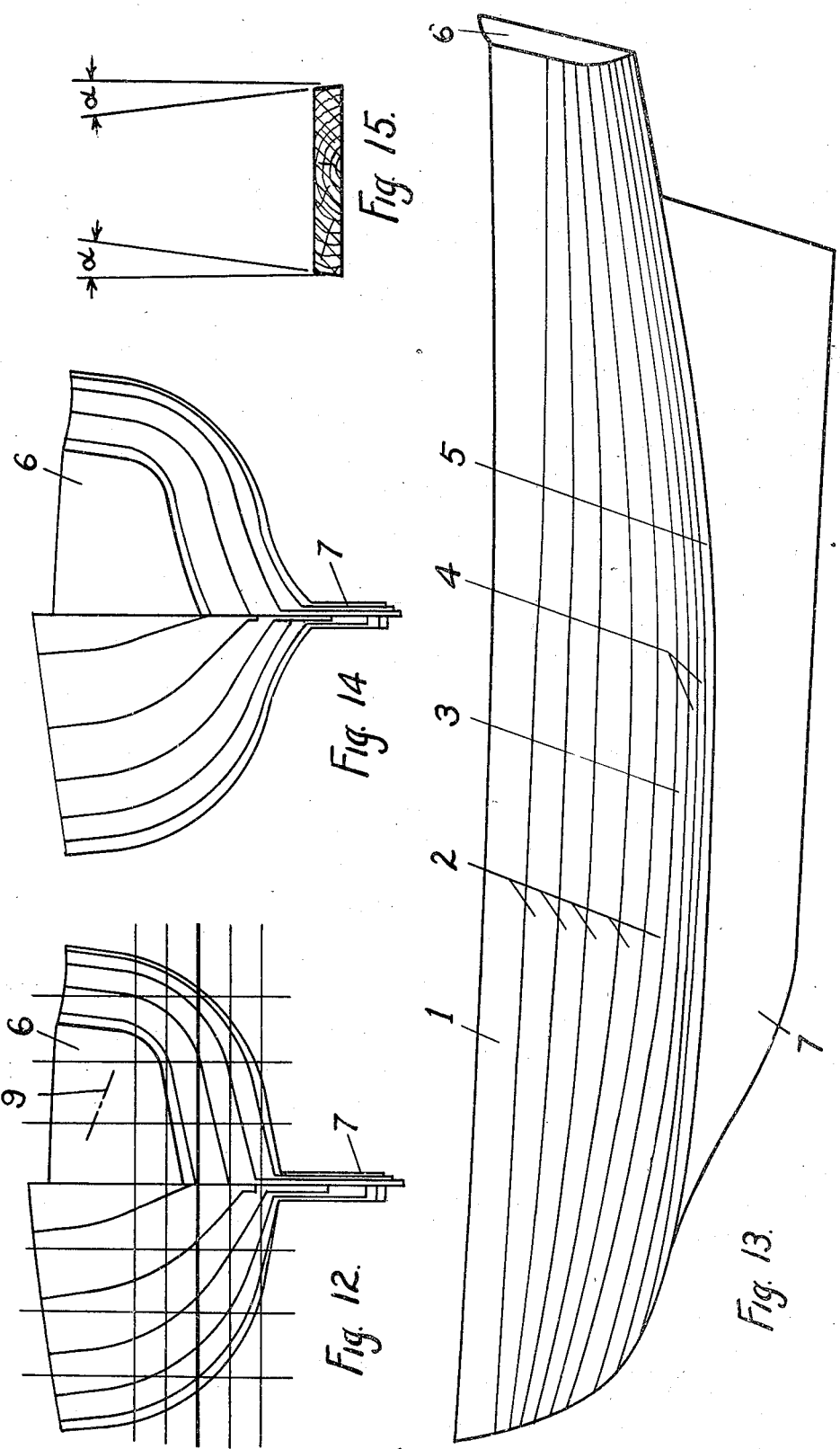
Alexander G. S. Sandison, Inventor.

March 19, 1946.  A. G. S. SANDISON  2,397,049
BOAT CONSTRUCTION
Filed Aug. 23, 1944  6 Sheets-Sheet 5

Alexander G. S. Sandison.  Inventor.

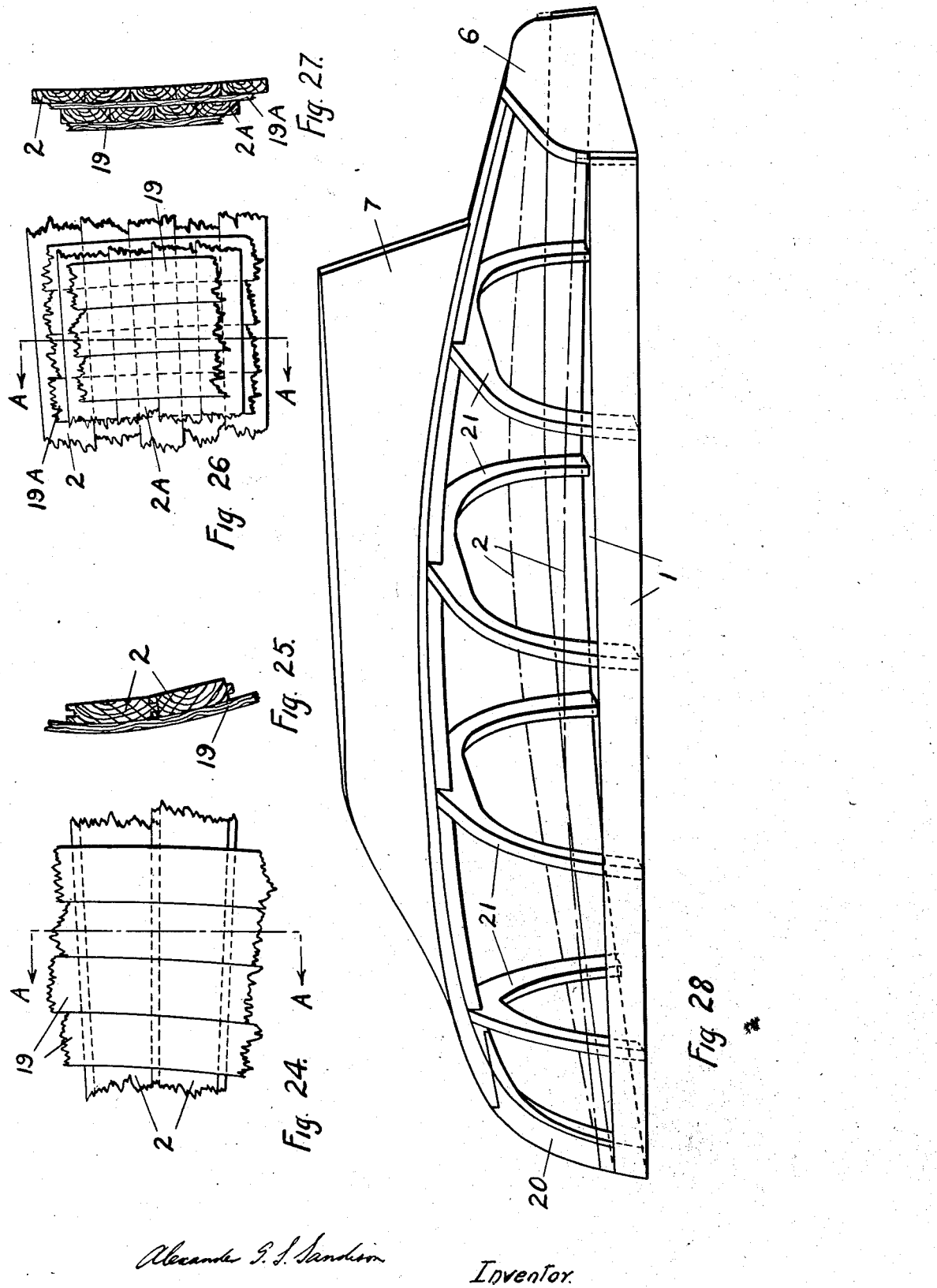

Patented Mar. 19, 1946

2,397,049

UNITED STATES PATENT OFFICE 2,397,049

BOAT CONSTRUCTION

Alexander Greswolde Seymour Sandison,
Brantford, Ontario, Canada

Application August 23, 1944, Serial No. 550,741
In Canada January 10, 1944

14 Claims. (Cl. 9—6)

This invention relates to improvements in the construction of boats having a plurality of longitudinal strakes. It is primarily intended for boats of wooden construction, but may be applied to boats having strakes of metal or other materials. It may also be applied to boats of laminated skin construction having a plurality of layers of longitudinal strakes with or without additional layers of transverse planking or veneers.

An object of this invention is to provide an improved construction which will facilitate the building of a boat largely from pre-fabricated components.

Another object of this invention is to provide an improved construction whereby the skin of a boat may be formed of strakes whose shape may be formed accurately by profiling machinery.

A further object of this invention is to provide an improved type of hull form in which fair curvature of the streamlines is inherently assured in the method of construction.

Yet another object of the invention is to provide an improved process of construction for boats whereby the time occupied in setting up and planking may be reduced in comparison with previously known methods.

The most common practice employed in the building of a boat is to set up frames or moulds of pre-designed shape to form a skeleton on which the planking forming the skin of the boat is built up, each plank or strake in turn being shaped individually so that its inner side lies against the moulds and so that one of its edges matches with that of an adjoining previously secured strake. Where a series of identical boats is to be built this practice is sometimes varied by building only the first boat of the series by this method and then taking this first boat to pieces and using the shaped strakes as templates for determining the shape of sets of strakes for planking further boats of the same size and model. This, however, can only prove economical where a considerable number of identical boats are required. Another variation is to use pre-fabricated strakes usually of arbitrarily chosen curved, tapered or parallel shapes and to assemble these with the application of edge-set to the strakes where necessary to make them conform to the moulded shape. This method, which is sometimes referred to as "strip building," usually involves employment of very narrow strakes, as it is evident that no considerable degree of edge-set can safely be imparted to wide strakes owing to their great rigidity edgewise.

While the methods outlined are those which are chiefly employed in planking the surface of compound curvature of round-bilged boats of the more usual types, simple methods of design and pre-fabrication can be applied when planking surfaces of compound curvature which are of the form of a surface of revolution such as is generated by the rotation of a generatrix or generating curve having fair curvature. In this case, each stave or strake may be designed to correspond to a sector included between two cutting planes which intersect at the axis of the surface of revolution and from this basis it is easy, by simple and well-known geometric methods, to design a series of staves or strakes from which a given surface of revolution of the type considered may be built up, or conversely to design a surface of revolution which may be built from a series of similar strakes whose edges are shaped to a given curvature. A familiar example of the method involved is an ordinary barrel having a bilge formed with compound curvature and which is built up of staves corresponding to sectors included between cutting planes which intersect at the axis of the barrel. It is preferable for reasons of simplicity, but not essential, for the staves to be of equal width. A set of staves of unequal widths (corresponding to unequal angles between the cutting planes considered) may be employed, but it will be noted that, for accurate construction, increase of the width of a stave must be accompanied by increased curvature on the edges of the stave. It will also be noted that correct matching of the edges of the staves is obtained by forming the edge of each stave at a constant angle of bevel whose value is dependent on the width of the stave. Theoretically, this constant angle of bevel should be measured after assembly and in a plane normal to the axis of the surface of revolution, but, provided that the slope of the generating curve with respect to the axis is not unduly great, it is sufficiently accurate to cut the edge of the stave with a constant angle of bevel while it is still straight, and before it is bent to its final curved form.

Boats have been designed in which the bilges, throughout their length, are formed as surfaces of revolution, and the bilge planking may then be designed and pre-fabricated by such simple methods as above outlined. However, the use of a surface of revolution to form the entire length of the bilge is applicable only to boats substantially of scow or pram type and is, in general, entirely unsuitable for boats having the more usually employed forms of bow. In the present invention this limitation is overcome by shaping the bilge strakes initially so as to be capable of assembly as a surface of revolution such as may be generated by rotation of a generating curve having fair convex curvature over at least the greater portion of its length, the strakes being subsequently assembled, without substantial edge-set, to form a surface which is substantially a surface of revolution over only part of its length, and which differs from the form of a surface of revolution over the remaining part of its length. The manner in which this may be carried out, and the principles involved, are illustrated in the following description.

Reference is made to the accompanying diagrammatic drawings, in which like or equivalent components are designated by like reference numerals and in which:

Fig. 12 is a half-body plan of the form of hull shown in Fig. 10.

Fig. 13 shows the assembly of a set of strakes to form one side of a hull.

Fig. 14 shows a half-body plan of a form of hull differing from that shown in Fig. 12.

Fig. 15 is a sectional diagram of a strake.

Fig. 24 is a fragmentary side elevation illustrating yet another method of constructional detail.

Fig. 25 is a fragmentary section on the line A—A on Fig. 24.

Fig. 26 is a fragmentary side elevation illustrating yet a further method of constructional detail.

Fig. 27 is a fragmentary section on the line A—A on Fig. 26.

Fig. 28 is a perspective view illustrating a process of construction.

Figure 1:
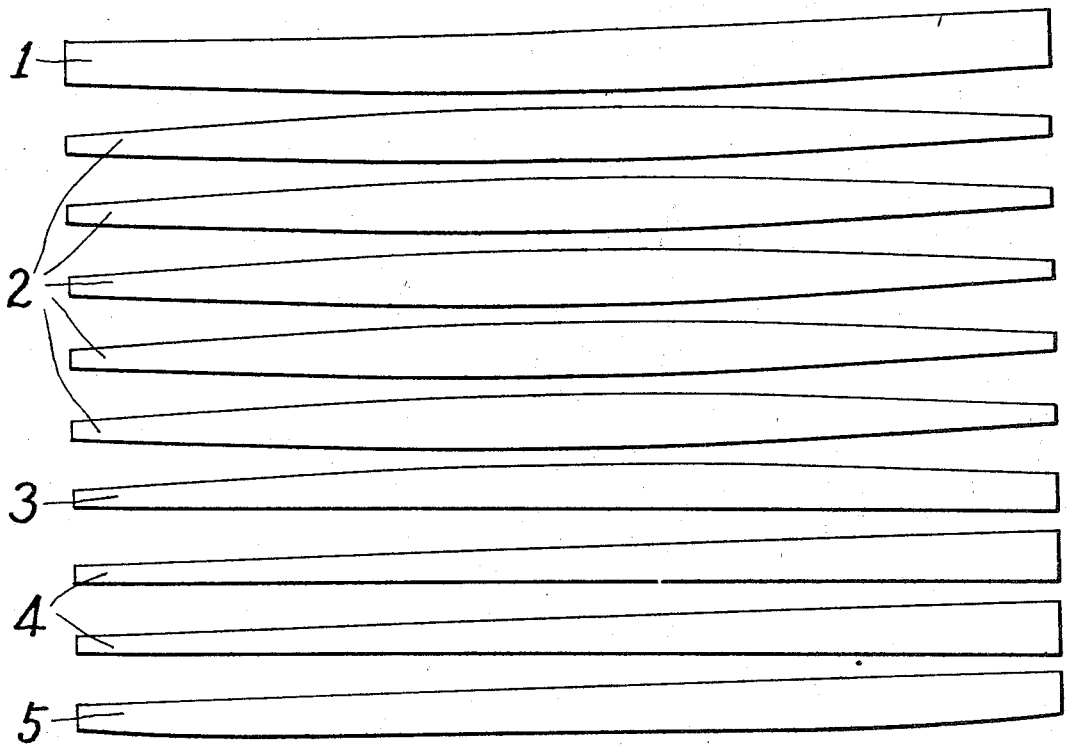
Fig. 1 shows a set of strakes before assembly, the widths being exaggerated for clearness.

Referring to Fig. 1, a typical set of strakes for planking a side of a boat in accordance with the invention comprises a sheer strake 1, bilge strakes 2, an intermediate strake 3, intermediate garboard strakes 4, and a garboard strake 5. The bilge strakes are so shaped as to be capable of assembly to form a surface which is substantially a surface of revolution having convex longitudinal curvature over at least the greater portion of its length, even though the manner in which they are assembled to form the bilge portion of a boat will in general result in a surface differing from a surface of revolution over at least a portion of the length, as is hereinafter described.

In the set of strakes illustrated in Fig. 1 the upper edge of the sheer strake is shaped to suit the requirements of the designed sheer line of the boat, and its lower edge has convex curvature over at least the greater portion of its length. All edges of the bilge strakes have convex curvature over the greater portion of their length. The upper edge of the intermediate strake has convex curvature over the greater portion of its length, but its lower edge is straight. The upper and lower edges of the intermediate garboard strakes are straight, and generally the bow end of these strakes is made narrower than the stern end. The upper edge of the garboard strake is straight and the lower edge is shaped preferably on assembly, to suit its junction with the keel.

In the preferred form of the invention the adjoining edges of each pair of adjacent strakes are shaped symmetrically; that is to say that their contours are similar but reversed, so that the one forms a mirror image of the other. It is also preferable for the bilge strakes to be substantially identical in shape in order to facilitate manufacture.

Figure 2:
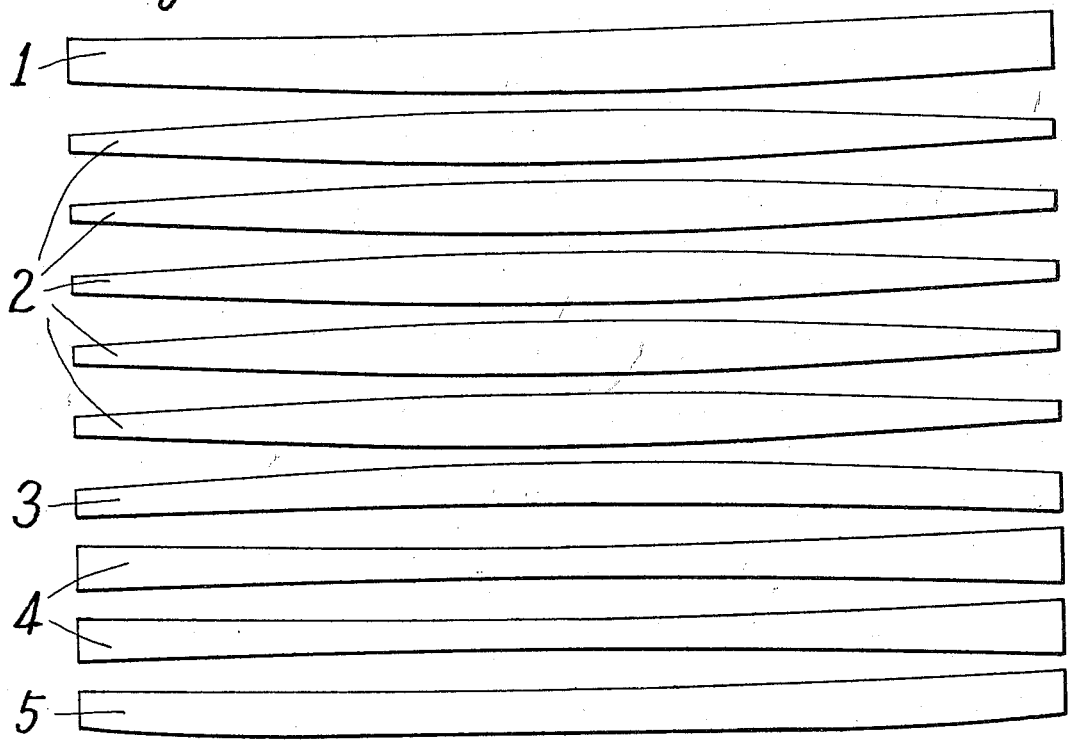
Fig. 2 shows another set of strakes before assembly, the width again being exaggerated for clearness.

Referring to Fig. 2, another typical set of strakes again comprises a sheer strake 1, bilge strakes 2, an intermediate strake 3, intermediate garboard strakes 4, and a garboard strake 5. This set of strakes differs from that shown in Fig. 1 only to the extent that the lower edge of the intermediate strake, both edges of the intermediate garboard strakes, and the upper edge of the garboard strake have concave curvature. It is preferred to form the intermediate garboard strakes so that they are capable of assembly to form a surface which is substantially a surface of revolution having concave longitudinal curvature.

It will be understood that strakes such as are shown in Figs. 1 and 2 and which are capable of assembly to form a surface which is substantially a surface of revolution are relatively easy to prefabricate as the shapes of their edges are precalculable and are in general such as may readily be generated or reproduced by suitable profiling machinery, such machinery being the subject of a co-pending patent application (application Serial No. 550,738, filed August 23rd, 1944) by the present inventor. Moreover, they can be cut from straight-edged planking with comparatively little wastage.

Figure 3:
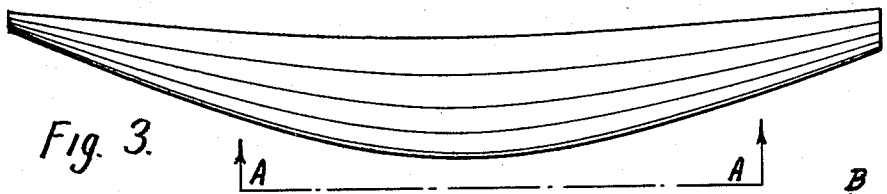
Fig. 3 shows a plan view of a possible assembly of a portion of a set of strakes.
Figures 4, 5:
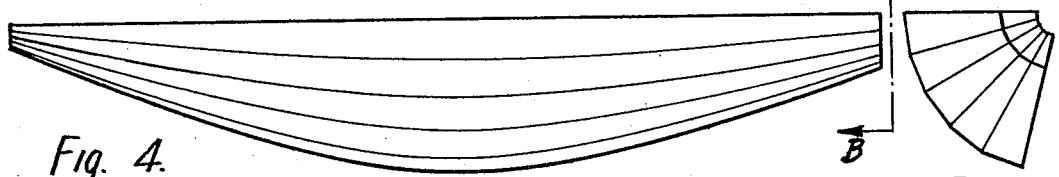
Fig. 4 shows a side elevation looking in the direction A—A on Fig. 3.
Fig. 5 shows an end elevation looking in the direction B—B on Fig. 4.
Figure 6:
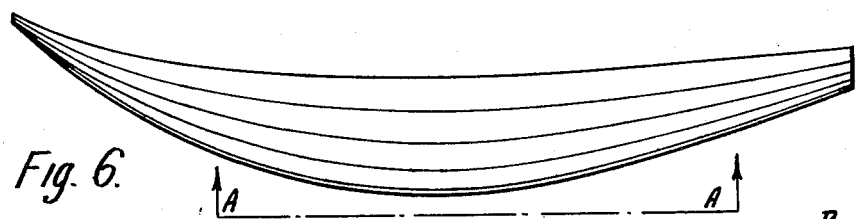
Fig. 6 shows a plan view of another possible assembly of a portion of a set of strakes.
Figures 7, 8:
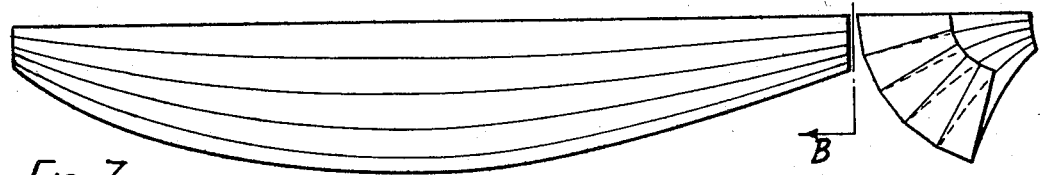
Fig. 7 shows a side elevation looking in the direction A—A on Fig. 6.
Fig. 8 shows an end elevation looking in the direction B—B on Fig. 7.

The assembly of bilge strakes, such as are shown in Fig. 1, to form a surface or shell which is substantially a surface of revolution is shown in Figs. 3, 4 and 5. Such a form is often suitable for the after portion of the bilge, but in general is unsuitable for the forward portion of the bilge where a relatively narrow entrance is usually desired. For this reason the bilge strakes, when assembled to form the bilge portion of the boat, are in general constrained to take a form other than a surface of revolution over at least a portion of their length. This is accomplished by distorting at least a portion of the shell to longitudinal and transverse curvatures differing from those of the corresponding part of the surface of revolution, and also by imparting some degree of twist to the strakes over at least a portion of the shell. For the purposes of this example it is assumed that the surface of revolution as shown in Figs. 3, 4 and 5 has its longitudinal curvature at a maximum in the middle, and that the degree of longitudinal curvature decreases continuously towards the end. It is further assumed for the purposes of this example that it is desired to maintain one end half of the shell substantially in the same shape as that of the corresponding portion of the original surface of revolution, but that the other half is to be constrained to a shape differing from that of the corresponding portion of the original surface of revolution primarily by bending the uppermost of the strakes to a constant longitudinal curvature equal to the maximum longitudinal curvature of the surface of revolution. The typical result of such a distortion is seen in Figs. 6, 7 and 8, the increase in longitudinal curvature being accompanied by a decrease in transverse curvature of the distorted portion of the shell. It will be understood that, in the case of strakes of normal width, while it is relatively easy to bend the strakes sideways or to impart a reasonable degree of twisting to them, it is difficult and undesirable to bend or set them edgewise to any great extent as this can only be done by the application of large forces. On the other hand, if one of the strakes, which may be termed a reference strake, is bent without appreciable twisting or edge-set to a given fair longitudinal curve differing from the generating curve, the remaining strakes may be brought into registration in turn by a process of bending and twisting so as to form a surface differing from that of a surface of revolution. The degree of twisting necessary to secure registration increases progressively as the strakes become more remote from the non-twisted reference strake, but in general little or no edge-set is necessary. In the example illustrated in Figs. 6, 7 and 8, the uppermost strake is the non-twisted reference strake, and succeeding lower strakes progressively have an increasing degree of twisting over the distorted portion of the shell. For a given set of strakes, when one of the strakes (the reference strake) is set to a definite curve, the remaining strakes positioned in succession will, if not otherwise constrained, also take up definite positions. In the present invention the method of assembly should be such as will impose a minimum of constraint on the planking and so permit it to take up as closely as possible this natural or unconstrained form, which is unique for a given set of strakes and for a given setting of the reference strake. In general it is impracticable to pre-determine, by theoretical methods of design, the exact shape which will be assumed by the planking under these conditions but the simple approximate methods of calculation outlined below give results which are close enough for practical purposes. A useful working approximation is that the ratio of initial to final transverse curvature of the distorted portion of the shell is inversely in the ratio of initial to final longitudinal curvature at the same portion of the shell. It will be understood that this approximation is applicable only within certain limitations, but in practical cases where the longitudinal curvatures of both the surface of revolution and the distorted shell change smoothly and gradually throughout their length, and where the degree of distortion is not excessive, the above approximation is sufficiently accurate to be used as a guide to design.

Figure 9:
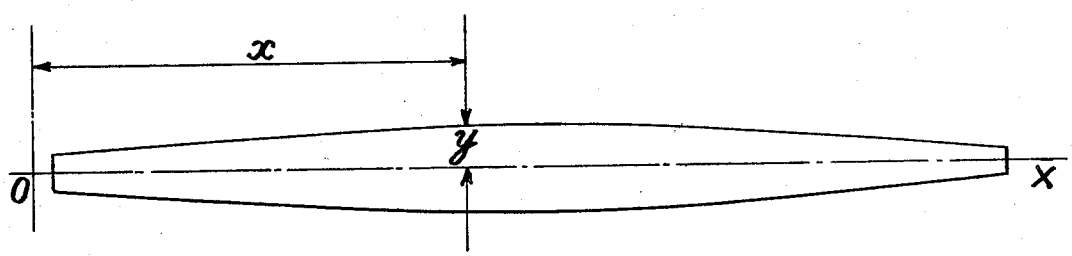
Fig. 9 is a diagram illustrating the shape of a strake.

The shaping of the edges of the bilge strakes to sinusoidal contours has been found to be very suitable for the construction of a boat having a type of hull form which is recognised as fast and seaworthy. Moreover strakes so shaped may readily be cut to correct shape by profiling machinery. The use of a sinusoidal curve is illustrated in the strake shown in Fig. 9, the edge of which is formed according to the formula $$y = A \sin (Bx+C) + Dx + E$$

where $y$ is the measurement from the edge of the strake to an arbitrary straight reference line O—X which may conveniently be the centre line of the strake if the latter is symmetrical, $x$ is the measurement from the arbitrary origin O on the reference line, and A, B, C, D and E are constants whose values are chosen according to the circumstances of design, and some of which, of course, may be zero or negative. It will be understood that similar bilge strakes formed to sinusoidal curves are capable of assembly substantially in the form of a surface of revolution, and that if the transverse curvature of this surface is high in comparison with the longitudinal curvature the surface of revolution will approximate to one generated by rotation of a generating curve which also is sinusoidal.

In selecting appropriate values for the constants of the above equation, it is useful to draw a series of sine curves with the same horizontal but with differing vertical scales. It is then easy to judge by eye what portion of which sine curve is most appropriate for adoption as a basis for the design in question, having regard particularly to the form of buttock lines and diagonals desired. Assuming that the origin of the curve defined by the equation is taken to correspond to the bow end of the strakes a few simple rules facilitate the choice of constants to suit a given type of design. For a flared type of bow the constant C should be negative but where the forward end of the hull has convex curvature in its transverse sections right up to the bow the constant C should be zero or positive. For types of buttock lines which are straight where they intersect the waterline the values of B and C should be such that $Bx+C$ approximates to $\pi$ at that part of the strake which corresponds to the after end of the waterline. For relatively hard-bilged boats E is made small in comparison with A but for boats with easy bilges the constant E may be increased. Variation in the constant D is used primarily to adjust the relative widths of the ends of the strakes. By applying these rules and well-known elementary mathematical principles it is not difficult for one skilled in the art to select appropriate values for the constants in the formula.

Figure 10:
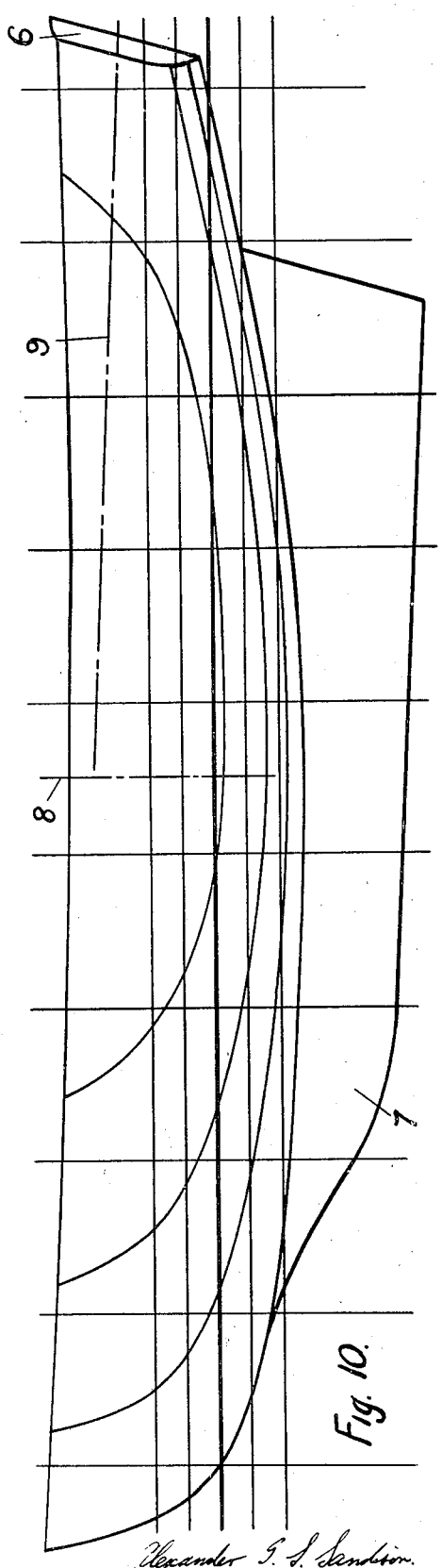
Fig. 10 is a "sheer plan" or side elevation of a form of hull.
Figure 11:
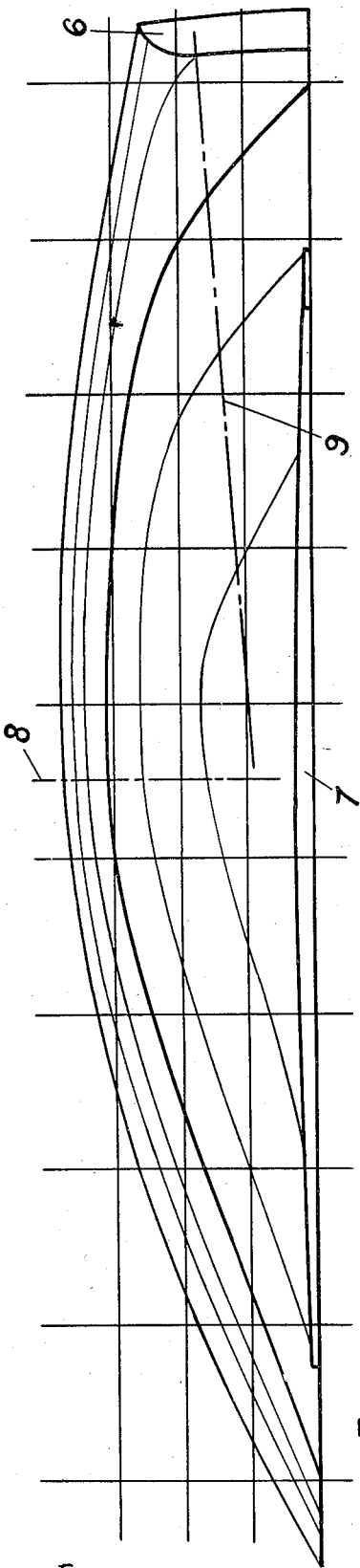
Fig. 11 is a half-breadth plan of the form of hull shown in Fig. 10.

In a typical example, the constants B and C may be so chosen that $Bx+C$ (expressed in radians) is equal to zero at the bow end of the strakes and equal to a quantity slightly greater than $\pi$ at the stern end of the strakes. Typical lines of a hull having strakes so formed, and using a set of strakes of the type illustrated in Fig. 1 and provided with a transom 6 and keel 7, are shown in Figs. 10, 11 and 12, and the typical assembly of such a set of strakes is shown in Fig. 13. In the example shown the portion of the bilge between the transom 6 and a position 8 approximately amidships is left substantially in the shape of a surface of revolution corresponding to an assembly of the bilge strakes without any twisting being applied, and the axis 9 of this surface of revolution is inclined slightly upward and inward from stern towards bow. The position 8 may preferably be that corresponding to a value $$Bx + C = \pi/2$$

and the longitudinal curvature of the sheer strake from that position onward towards the bow is arranged to be constant and equal to the longitudinal curvature at position 8. The bilge strakes, intermediate strake, intermediate garboard strakes and garboard strake, positioned successively, may then be constrained, without undue stressing, to conform to a hull form of the type shown in the hull lines in this example. A considerable degree of twisting may have to be imparted to the forward ends of the lower strakes, but in general no great amount of edge-set is necessary.

In the body plan shown in Fig. 12 it will be noted that the garboard portion of the hull between keel and commencement of the turn of the bilge is straight in transverse section for the greater portion of the length, but becomes slightly convex towards the bow. This is typical of the form resulting where straight-edged intermediate garboard strakes, such as are shown in Fig. 1, are employed; the slight convex transverse curvature towards the bow resulting from the distortion given to the strakes towards the bow. By forming the intermediate garboard strakes with concave edges, as shown in Fig. 2, the corresponding portion of the hull can be arranged to have reverse curvature or concavity in transverse section, as shown in Fig. 14, over the greater portion or all of the length.

Figure 16:
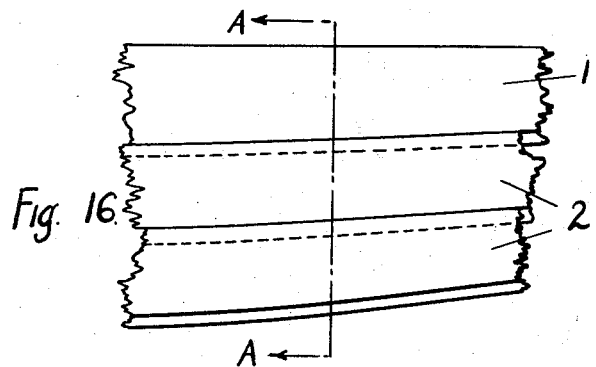
Fig. 16 is a fragmentary side elevation illustrating a method of constructional detail.

In the description up to this point matters relating to the thickness of the planking have been neglected. However, where the method of planking the boat is the carvel method, or any other method wherein the strakes butt edge to edge with or without the provision of a slight gap between the strakes for the insertion of caulking, it is evident that the edges of the strakes require to be bevelled, at least wherever considerable curvature exists on the transverse sections. For this reason each bilge strake is usually bevelled at the edges to an angle of bevel $\alpha$ as shown in Fig. 16. In general the edges of the bilge strakes are cut so that the angle $\alpha$ is constant over the stern portion of the strake, if the after portion of the bilge is to be formed substantially as an undistorted surface of revolution, but the angle $\alpha$ then decreases progressively towards the bow if the forward portion of the bilge is to be formed with distortion such as is described with reference to Figs. 6, 7 and 8. Where the shape of the bilge strakes is as described with reference to Fig. 9 with intended assembly to a form of bilge such as is described with reference to Figs. 10–13 inclusive, a sufficiently close approximation to ensure good matching of the edges is to make the tangent of the angle of bevel $\alpha$ proportional to $\sin(Bx+C)$, over the forward portion of the bilge strakes. It will be understood that the angle of bevel may be arranged either to permit as close a joint as possible between the edges of the strakes, or alternatively may be arranged to leave a tapering gap to receive caulking, the use of such a gap being well-known.

While strakes cut as described are applicable to most of the well-known methods of boat construction, they are particularly applicable to methods of construction employing edge-gluing, edge-fastening, or a combination of these methods. Examples of such methods of construction are seen in Figs. 16–23 inclusive.

Figure 17:
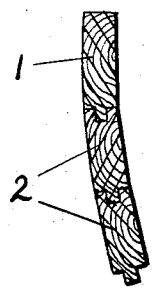
Fig. 17 is a fragmentary section on the line A—A on Fig. 16.

In the method shown in Figs. 16 and 17 the edges of adjacent strakes are matched by tongue and groove, cut at the appropriate angles of bevel. It is preferable for the matching surfaces to be glued in addition.

Figure 18:
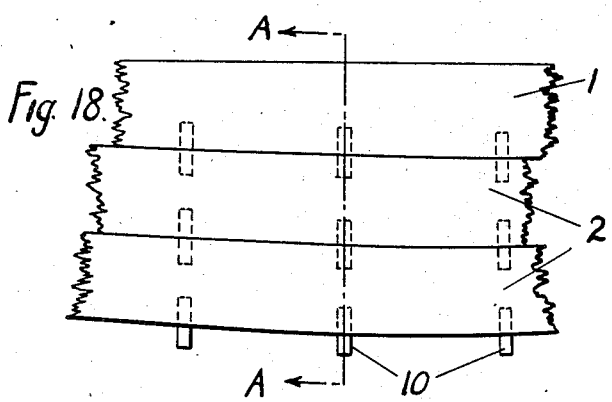
Fig. 18 is a fragmentary side elevation illustrating another method of constructional detail.
Figure 19:
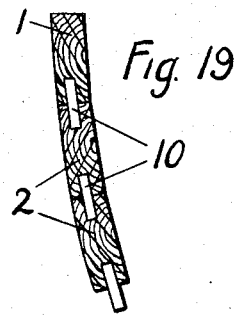
Fig. 19 is a fragmentary section on the line A—A on Fig. 18.
Figure 20:
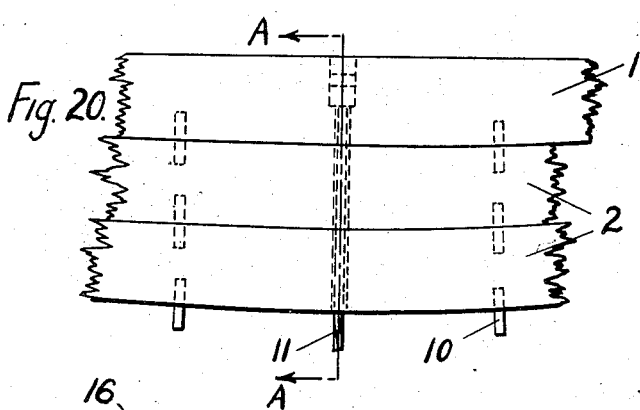
Fig. 20 is a fragmentary side elevation illustrating a further method of constructional detail.
Figure 21:
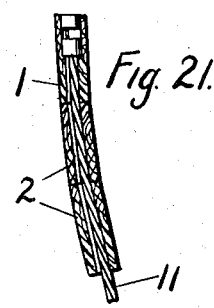
Fig. 21 is a fragmentary section on the line A—A on Fig. 20.
Figures 22, 23:
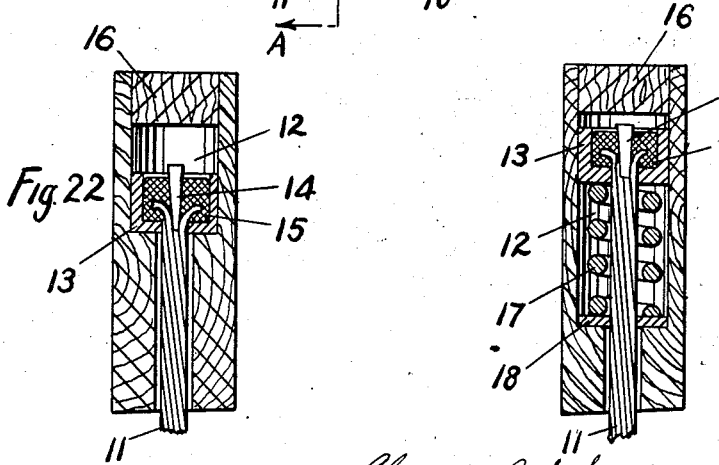
Fig. 22 is an enlarged detail on the line A—A on Fig. 20.
Fig. 23 is an enlarged detail on the line A—A on Fig. 20, alternative to that shown in Fig. 22.

In the method shown in Figs. 18 and 19 the edges of adjacent strakes are secured by dowels 10, which are inserted in holes drilled in the edges. It is preferable for the matching surfaces to be glued in addition.

In the method shown in Figs. 20–23 inclusive, in addition to dowels 10, the strakes are also fastened with stranded wires 11 threaded through matching holes drilled through the planking prior to assembly. The ends of the strands are located in counterbores 12 having cup washers 13 through which the strands are threaded. The strands are spread out at the ends, locked by insertion of a taper pin 14 between the wires and further secured with white metal or the like 15 poured into the cup washers. A plug 16 inserted in the counterbore acts as a closure to the hole. The form of end fastening shown in Fig. 23 differs from that shown in Fig. 22 only in the addition of a spring 17 and bearing washer 18 for the purpose of maintaining resilient tension on the stranded wires to allow for transverse swelling or shrinkage of the planking.

The accurate drilling, before assembly, of the holes to receive the dowels is facilitated when the strakes are so shaped that their adjoining edges have symmetrical contours, as then the holes themselves will also be positioned symmetrically, simplifying the determination of their correct positions prior to the assembly of the strakes.

Strakes formed as described in this specification are also applicable to double skin and veneer methods of construction. Examples of such methods of construction are seen in Figs. 24–27 inclusive.

In the method of construction shown in Figs. 24 and 25 the longitudinal strakes 2, which for ease of assembly may be formed with tongue and groove edges, as described with reference to Figs. 16 and 17, form the inner skin of the construction, and transverse planking strips 19 form the outer skin of the construction. While the transverse strips may be laid on the strakes at any suitable angle, it is preferable, for purposes of more convenient pre-fabrication, to arrange for them to cross the inner skin at right angles to the joints between the stakes. Where this method is used and where the longitudinal strakes are so shaped as to be capable of assembly to form a surface of revolution, the edges of the transverse planking strips, over that portion of their length which registers with longitudinal strakes so shaped will be substantially of the form of circular arcs before bending into position. The correct radius of these arcs may readily be determined by development of the zones of the surface of revolution corresponding to the position of each transverse planking strip.

Before application of the transverse outer skin the inner skin is usually faired to a smooth curvature to permit even bending of the outer skin.

The outer skin may be fastened by gluing, by screws, by nails, or by through fastenings, or by a combination of these methods.

The method of construction shown in Figs. 26 and 27 exemplifies a veneer or multiple skin method of construction. This method of construction is essentially similar to that described with reference to Figs. 24 and 25, but in this case, in addition to the inner longitudinal strakes 2 and outer transverse planking strips 19, there is also an intermediate set of longitudinal strakes 2A and an intermediate set of transverse planking strips 19A.

In the process of construction and assembly of a boat according to the present invention it is preferable, when commencing planking, first to establish the sheer strakes in their intended position and then to continue the planking by matching the edges of succeeding strakes with those previously in place, the form of the hull being inherently predetermined by the shapes of the edges of the strakes and by the shape to which the sheer strakes are bent.

A method of setting up and assembly is exemplified in Fig. 28 which shows a stage of construction in which the keel 7, transom 6, stem 20, and frames 21 have been assembled in their correct relative positions, and in which the sheer strakes 1 have also been established in their correct relative positions. It is preferable for the transom, stem and frames to be left oversize at this stage except where they make contact with the sheer strakes. The first bilge strakes 2, shown in chain-dotted line, are then placed in position and so constrained that their edges adjacent to the sheer strakes lie in registration with the matching edges of the sheer strakes; the oversize transom, stem and frames geing cut to size as may be necessary so that they make correct contact with the bilge strakes when the latter are constrained as described. The ends of the strakes are trimmed to length to suit the assembly. Succeeding strakes are assembled in similar fashion, each in turn being placed in position so that its edge adjacent to the preceding strake lies in registration with the matching edge of the preceding strake. A degree of twisting is usually also imparted to portions of the strakes. As the form of the hull is inherently pre-determined by the shapes of the edges of the strakes, it will be understood that fair curvature of the hull streamlines is assured, providing that the edges of the strakes are themselves formed with fair curvature. A certain amount of additional constraint may sometimes be applied to the strakes as the planking proceeds in order to make some slight desired adjustment in the hull form, or to prevent variation in the hull form due to lack of uniformity in the properties of the materials of the strakes; but such additional constraint should preferably be kept to a minimum. Such additional constraint when applied is usually accomplished by so cutting the transom, stem and frames as not to conform exactly to the natural form that would otherwise be assumed by the strakes on assembly, and it will be understood that additional constraint of this nature tends to stress the planking and should therefore be used only to a limited extent.

It will be understood that the method of assembly described is not the only one that can be employed and that a pair of strakes other than the sheer strakes could equally well have been selected for initial establishment in correct position to guide the correct continuation of the planking. Generally, however, the initial establishment of the sheer strakes in correct position, as described, is found to be preferable. One reason for this is that in many forms of boat the sheer strake is given little if any twist whereas an increasing degree of twist is imparted to portions of the succeeding strakes, so that the sheer strakes are generally the easiest to establish initially in correct position; also, where the sheer strake is not given any twist, and where the bilge strakes are capable of assembly to a surface which is substantially a surface of revolution, the curve to which the sheer strake should be bent to produce a desired distortion of this surface of revolution can be estimated in advance with considerable accuracy.

I claim:

1. In the process of construction of a boat having a plurality of longitudinal strakes; the initial shaping of the bilge strakes so as to be capable of assembly to form a surface which is substantially a surface of revolution such as may be generated by rotation of a generating curve having fair convex curvature over at least the greater portion of its length, said bilge strakes being subsequently assembled, without substantial edge-set, to form a surface which is substantially a surface of revolution over part of its length but which differs from a surface of revolution over the remaining portion of its length.

2. In the process of construction of a boat having a plurality of longitudinal strakes; the shaping of adjoining edges of the bilge strakes to symmetrical contours such as correspond to those of axial sectors of a surface of revolution generated by rotation of a generating curve having fair convex curvature over at least the greater portion of its length, said bilge strakes being subsequently assembled, without substantial edge-set, to form a surface which is substantially a surface of revolution over part of its length but which differs from a surface of revolution over the remaining portion of its length.

3. In a boat having a plurality of longitudinal strakes; the combination of an after portion of the turn of the bilge formed substantially as a portion of a surface of revolution and a forward portion of the turn of the bilge to form differing from a surface of revolution.

4. In a boat having a plurality of longitudinal strakes; the combination of an after portion of the turn of the bilge formed substantially as a portion of a surface of revolution having its axis inclined inward and upward from stern towards bow and a forward portion of the turn of the bilge of form differing from a surface of revolution.

5. In the process of construction of a boat having a plurality of longitudinal strakes; the initial formation of the bilge strakes so as to be capable of assembly to form a surface which is substantiallly a surface of revolution having convex axial curvature, said axial curvature being greater at the middle than at the ends; said bilge strakes being subsequently assembled, without substantial edge-set, in the form of a surface of revolution over one portion of its length but in a form differing from a surface of revolution and having axial curvature approximating to the maximum convex axial curvature of said surface of revolution for the remaining portion of its length.

6. In the process of construction of a boat having a plurality of longitudinal strakes; the initial formation of the bilge strakes so as to be capable of assembly to form a surface which is substantially a surface of revolution formed by the rotation of a sinusoidal generating curve having convex longitudinal curvature; said bilge strakes being subsequently assembled with longitudinal curvature not identical with that of said generating curve.

7. In the process of construction of a boat having a plurality of longitudinal strakes; the initial formation of the bilge strakes so as to be capable of assembly to form a surface which is substantially a surface of revolution formed by the rotation of a generating curve having convex longitudinal curvature, said bilge strakes being assembled to form a like surface of revolution over part of their length and to form a surface having axial curvature differing from that of said generating curve over another portion of their length.

8. In the process of construction of a boat having a plurality of longitudinal strakes; the initial formation of the bilge strakes so as to be capable of assembly to form a surface which is substantially a surface of revolution formed by the rotation of a sinusoidal generating curve, said bilge strakes being assembled to form a like surface of revolution over part of their length and to form a surface having axial curvature substantially equal to the maximum curvature of said generating curve over another portion of their length.

9. In the process of construction of a boat having a plurality of longitudinal strakes; the formation of the after portion of the sheer strake in a curve of approximately sinusoidal form, combined with the formation of the forward portion of said sheer strake in a curve of substantially uniform curvature.

10. In a boat having a plurality of longitudinal strakes; the combination of strakes shaped to have adjoining edges of symmetrical contour, and edge fastenings for said strakes comprising dowels and resiliently tensioned wires located in holes symmetrically formed in said adjoining edges.

11. In a boat having a plurality of longitudinal strakes and a skin of transverse planking; the combination of bilge strakes initially formed so as to be capable of assembly to form a surface which is substantially a surface of revolution, and transverse planking strips having their edges initially formed as circular arcs over that portion of their length which registers with said bilge strakes on assembly.

12. In the process of construction of a boat having a plurality of longitudinal strakes, and having bilge strakes initially formed substantially in the shape of developed sectors of a surface of revolution, and sheer strakes longitudinally bent to a curve differing from the generator of said surface of revolution; the assembly of those bilge strakes adjacent to said sheer strakes by bending and twisting so that their edges match the edges of said sheer strakes, and the assembly of succeeding bilge strakes by bending and twisting so that their edges match the edges of the preceding bilge strakes, the amount of twisting in each succeeding bilge strake being greater than that in the adjacent previously assembled bilge strake.

13. In the process of construction of a boat having a plurality of longitudinal strakes; the shaping of the edges of said strakes substantially in accordance with the formula $$y = A \sin (Bx+C) + Dx + E$$

where $y$ is the measurement from the edge of a strake to an arbitrary straight reference line, $x$ is the measurement along said line from an arbitrary origin located on said line, and $A$, $B$, $C$, $D$ and $E$ are constants; combined with the bevelling of said edges to a constant angle over a portion of their length, and the bevelling of said edges to an angle whose tangent is substantially proportional to $\sin (Bx+C)$ over another portion of their length.

14. In the process of construction of a boat having a plurality of longitudinal strakes, including bilge strakes initially formed substantially in the shape of developed sectors of a surface of revolution; the initial mounting of one of said strakes without any substantial degree of twisting in a curve differing from the generator of said surface of revolution so as to form a reference strake determining the form of the boat, followed by the assembly of succeeding bilge strakes by bending and twisting so that the edge of each strake matches the edge of a previously mounted strake, the amount of twisting in each succeeding strake increasing over that in the adjacent previously mounted strake.

ALEXANDER G. S. SANDISON.